United States Patent
Ruijter

(10) Patent No.: US 8,064,861 B2
(45) Date of Patent: Nov. 22, 2011

(54) CIRCUIT AND METHOD FOR ANTENNA SELECTION IN AN ANTENNA DIVERSITY RECEIVER

(75) Inventor: Hendricus De Ruijter, Sunnyvale, CA (US)

(73) Assignee: Silicon Laboratories Inc., Austin, TX (US)

( * ) Notice: Subject to any disclaimer, the term of this patent is extended or adjusted under 35 U.S.C. 154(b) by 440 days.

(21) Appl. No.: 12/338,304

(22) Filed: Dec. 18, 2008

(65) Prior Publication Data

US 2009/0258622 A1 Oct. 15, 2009

Related U.S. Application Data

(60) Provisional application No. 61/044,829, filed on Apr. 14, 2008.

(51) Int. Cl.
*H04B 1/06* (2006.01)

(52) U.S. Cl. ............... 455/277.1; 455/226.1; 455/226.2; 455/277.2; 455/134; 455/135

(58) Field of Classification Search ............... 445/67.11, 445/133–135, 226.1, 226.3, 227.1, 227.2, 445/227.3; 375/267, 299, 347; 370/280
See application file for complete search history.

(56) References Cited

U.S. PATENT DOCUMENTS

| | | | | |
|---|---|---|---|---|
| 5,561,673 A | * | 10/1996 | Takai et al. | 714/708 |
| 5,952,963 A | * | 9/1999 | Shen et al. | 342/367 |
| 6,018,555 A | | 1/2000 | Mahany | 375/347 |
| 6,085,076 A | * | 7/2000 | Lindsay et al. | 455/277.1 |
| 6,847,810 B2 | * | 1/2005 | Shen et al. | 455/277.2 |
| 7,149,480 B2 | * | 12/2006 | Miyahara | 455/78 |
| 7,315,733 B2 | * | 1/2008 | Ohsuge | 455/277.1 |
| 7,499,691 B1 | * | 3/2009 | Dunn et al. | 455/277.2 |
| 7,706,768 B2 | * | 4/2010 | Qiu et al. | 455/277.1 |
| 2003/0060178 A1 | * | 3/2003 | Ghassemzadeh et al. | 455/277.1 |
| 2005/0026585 A1 | * | 2/2005 | Jimi et al. | 455/272 |
| 2005/0059431 A1 | * | 3/2005 | Matsui et al. | 455/562.1 |
| 2005/0113039 A1 | * | 5/2005 | Tsukamoto | 455/101 |
| 2005/0197086 A1 | * | 9/2005 | Ogawa et al. | 455/277.1 |
| 2005/0215214 A1 | * | 9/2005 | Moorti et al. | 455/193.1 |

* cited by examiner

*Primary Examiner* — Linh Nguyen

(74) *Attorney, Agent, or Firm* — O'Keefe, Egan Peterman & Enders LLP

(57) ABSTRACT

An asynchronous receiver system has multiple antennae and an asynchronous receiver circuit with a signal input. The asynchronous receiver circuit receives a wireless signal at the signal input and generates a first quality signal responsive to the received wireless signal. A switch selects one of the antennae for coupling to the input of the asynchronous receiver circuit responsive to a control signal. A controller receives the first quality signal and generates the switching control signal. The controller sequentially selects each one of the antennae, measures the first quality signal and starts a timer with a time value for the selected antenna. The controller selects a next one of the antennae if the measured first quality signal value is below a threshold value and the timer expires and receives a remainder of a data packet based on the measured first signal quality values for the plurality of antennae.

21 Claims, 4 Drawing Sheets

CIRCUIT AND METHOD FOR ANTENNA SELECTION IN AN ANTENNA DIVERSITY RECEIVER

CROSS-REFERENCE TO RELATED PATENT APPLICATIONS

This patent application claims the benefit of U.S. Provisional Patent Application No. 61/044,829, filed Apr. 14, 2008.

FIELD OF THE INVENTION

This invention pertains to radio frequency receivers and, more particularly, antenna diversity receivers.

BACKGROUND OF THE INVENTION

Radio propagation is often limited by multipath fading, which is typically characterized by antenna position dependant phase and amplitude variations. To mitigate these fades, antenna diversity is commonly used were a receiver can select an antenna that provides the highest signal quality.

Conventional Antenna Diversity receivers are typically optimized to perform in a synchronized fashion. One examples of a conventional receiver is Advanced Antenna Diversity Mechanism by Qun Shen and Michael Lenzo, U.S. Pat. No. 5,952,963 issued Sep. 14, 1999 ("Chen"). Another example is Network utilizing modified preamble that supports antenna diversity by Ronald L. Mahany, U.S. Pat. No. 6,018,555 issued Jan. 25, 2003 ("Mahany"). By maintaining a timer the receiver knows when to start reception and can immediately start to assess the signal quality. After that the receiver switches to another antenna and again assesses the signal quality. The antenna that reveals the highest quality is finally selected to receive the remainder of the packet. In Chen, Time Division Multiple Access (TDMA) technology is employed. Referring to FIG. 1 of Chen, the receiver is synchronized according to the TDMA time slots and using this synchronization it identifies received packet message fields such as the preamble 16, synch word 18, data field 20, and the CRC, and it assesses the signal quality corresponding to those fields, for example using Receive Signal Strength Indicators RSSI0 10 and RSSI 1 12. Comparator 14 outputs the selection. In Mahany, the preamble contains multiple portions. The preamble portions are identified by the receiver and the quality is assessed for each. In both references, the antenna selection relies on the receiver's knowledge of where certain fields are in the received message due to the synchronous timing relationship between the received packet and a timing reference in or available to the receiver.

BRIEF SUMMARY OF THE INVENTION

In one embodiment, an asynchronous receiver system is shown that has a plurality of antennae. An asynchronous receiver circuit with a signal input is configured to asynchronously receive a wireless signal at the signal input and generate a first quality signal responsive to the received wireless signal. A switch is configured to controllably select one of the plurality of antennae for coupling to the input of the asynchronous receiver circuit responsive to a control signal. A controller is configured to receive the first quality signal and generate the switching control signal, where the controller is configured to sequentially select each one of the plurality of antennae, measure the first quality signal and start a timer with a time value for the selected antenna, select a next one of the plurality of antennae if the timer expires, store the measured values for the first quality signal, and select one of the plurality of antenna to receive a remainder of a data packet based on the measured first signal quality values for the plurality of antennae. In a refinement of this embodiment, the controller receives a remainder of a data packet on the selected antenna if the measured first quality signal value meets the first threshold value. In another refinement of this embodiment, the first quality signal is at least one of a signal quality, which may be generated by a signal correlator or a receive signal strength indicator (RSSI), and a packet quality. In yet another refinement of this embodiment, the time value of the timer is not greater than a packet preamble divided by the number of antennae of the plurality of antennae.

In still another refinement of the receiver system, the controller is configured to measure the first quality signal for each one of the plurality of antennae and select the antenna with the highest first quality value to receive the remainder of the data packet. In a further refinement, the timer is prolonged by the controller when the first signal quality signal exceeds a second threshold that is lower than the first threshold. In another further refinement, the controller is configured to switch to a next one of the plurality of antennae before the timer expires when the first signal quality signal exceeds the first threshold. In yet still another refinement of this embodiment, the controller is further configured to measure a second quality signal for each one of the plurality of antennae and select the antenna with the highest value for the second quality signal to receive the remainder of the data packet. In a further refinement, the first quality signal is a packet quality signal and the second quality signal is a signal quality signal. In one other refinement, the controller is configured to measure a second quality signal for each one of the plurality of antennae, select the antenna with the highest value for the second quality signal, measure the first quality signal for the selected antenna, receive the remainder of the data packet using the selected antenna when the first quality signal for the selected antenna meets the threshold value, and select another one of the plurality of antennae if the measured first quality value does not meet the threshold value.

An embodiment of a method for asynchronously receiving a data packet in an antenna diversity receiver having multiple antennas, involves generating a first quality signal for a received signal. The method sets forth sequentially selecting each of the antennas and, for each selected antenna, measuring a first quality signal and starting a timer with a time value for the selected antenna. The method calls for selecting a next one of the antennas if the measured first quality signal value is below a threshold value and the timer expires, and receiving a remainder of a data packet on the selected antenna based on the measured first signal quality values for the plurality of antennae. In a refinement of this embodiment, the step of receiving a remainder of a data packet on the selected antenna based on the measured first signal quality values involves receiving a remainder of a data packet on the selected antenna if the measured first quality signal value meets the first threshold value. In another refinement of the method, the first quality signal is either a signal quality or a packet quality. In still another refinement, the time value of the timer is not greater than a packet preamble time length divided by the number of antennas of the diversity receiver.

In yet another refinement of the method, the step of sequentially selecting each of the antennas involves measuring the first quality signal for all of the antennas and selecting the antenna with the highest first quality signal value to receive the remainder of the data packet. In still another refinement, the step of sequentially selecting each of the antennas involves measuring a second quality signal for each of the antennas and the step of receiving a remainder of the data packet involves selecting the antenna with the highest value for the second quality signal to receive the remainder of the data packet and may be further refined such that the first quality signal is a packet quality signal and the second quality signal is a signal quality signal. In still yet another refinement, the step of sequentially selecting each of the antennas further involves measuring a second quality signal for each of the antennas, measuring the first quality signal for the antenna with the highest value for the second quality signal, and the step of receiving a remainder of the data packet further involves selecting the antenna with the highest value for the second quality signal to receive the remainder of the data packet when the first quality signal for the selected antenna meets the threshold value, and select another one of the plurality of antennae if the measured first quality value does not meet the threshold value.

BRIEF DESCRIPTION OF THE DRAWINGS

Certain exemplary embodiments of the present invention are described in detail below with the respect to the following drawings, wherein.

DETAILED DESCRIPTION OF THE INVENTION

A problem with many convention approaches to asynchronous packet reception is that the receiver may be trying to receive the packet on an antenna that has very poor signal and the packet is missed. Another problem that can occur is that interference could trick the receiver to select the wrong antenna. Yet another problem relates to the required preamble length. When the antenna diversity receiver needs to select the optimal antenna during the preamble, then finding the start of the packet and measure Signal Quality on multiple antennas increases the preamble length requirement. Short preambles are desirable since this will reduce current consumption on both sides of the link by reducing the required on-time. Mahaney suggests reducing the preamble length requirement, but this may complicate the receiver system since preamble sequences are usually optimized to provide fast bit clock recovery. One aspect of the present invention is that it does not typically place additional constraints on the preamble and, therefore, does not negatively impact clock recovery.

Figure 6:
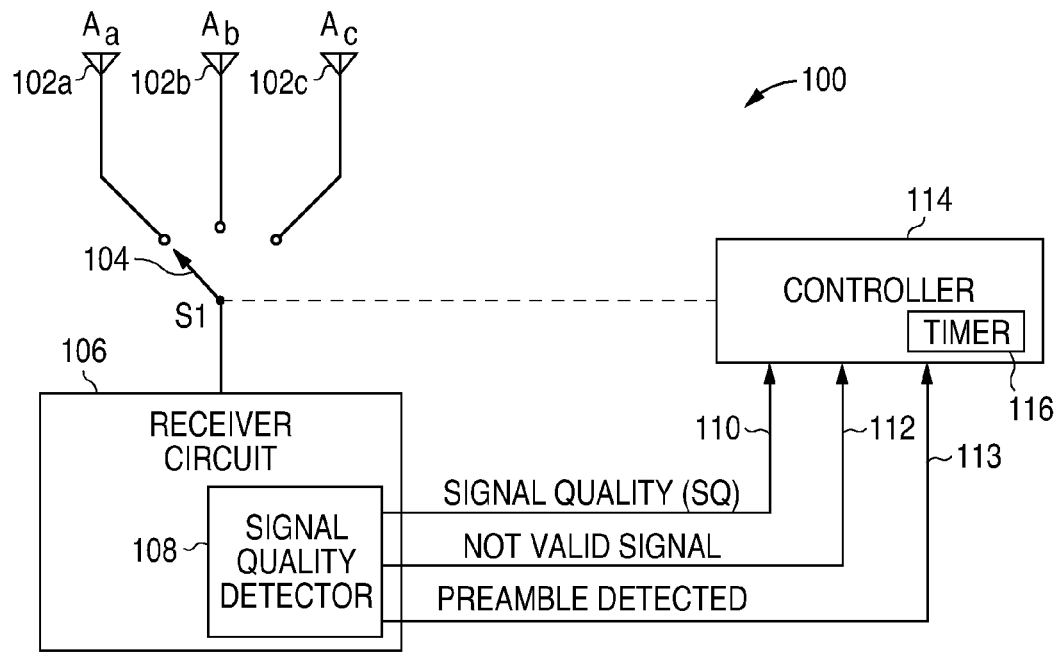
FIG. 6 is a functional block diagram illustrating an embodiment of an antenna diversity receiver configured to operate in accordance with certain aspects of the present invention.

In one exemplary embodiment of the present invention, referring to FIG. 6, an asynchronous receiver system 100 is capable of selecting an antenna from a plurality of antennae 102 to accomplish receiving a signal that is not synchronized with the asynchronous receiver system 100. The system comprises at least two antenna 102a-c, a switch 104 to select an antenna 102, a receiver circuit 106 that connects to the selected antenna 102 coupled by the switch 104 and outputs a signal quality signal 110 that indicates the quality of the received wireless signal, a controller 114 which controls the switch 104, thereby selecting the antenna 102, and receives the signal quality signal 110 from the receiver circuit 106 as input, and an algorithm executed by the controller 114 that determines when to select each antenna 102 for signal quality assessment, decides which antenna 102 to select for receipt of data based on the signal quality received from each antenna 102, and selects said antenna 102 for receipt of data.

One aspect of the present invention is that it allows a receiver system to utilize a sufficient or optimal antenna selection to receive data from an incoming packet that is not synchronized to the receiver. The present invention does not require the receiver to be synchronized with the incoming messages. When the receiver does not have any knowledge about when the packet is sent, then two tasks are required. First, find the start of the packet and, secondly, select the antenna that results in the best reception The present invention is based on the insight that multipath fading can cause the signal to fade under the receiver sensitivity threshold. In asynchronous communication systems, the receiver does not have any knowledge about the arrival time of the received signal (or packet). The receiver may receive some noise or interference before the actual packet arrives. When the packet finally arrives the selected antenna might reside in a strong fading dip and the packet is missed.

Figure 1:
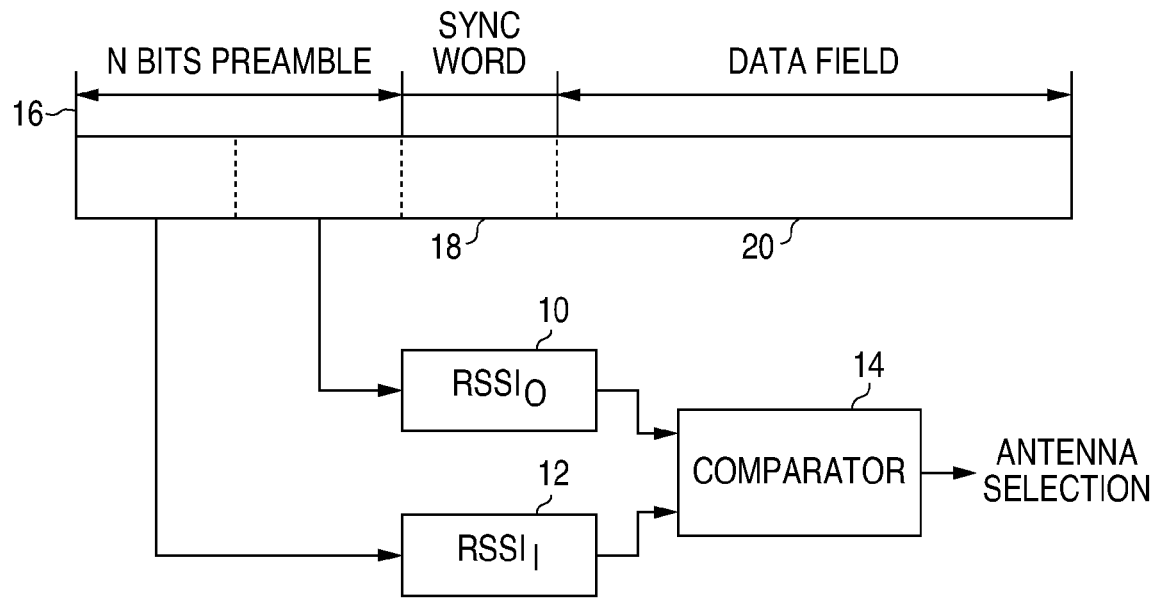
FIG. 1 is a block diagram illustrating an example of a conventional receiver.
Figure 2:
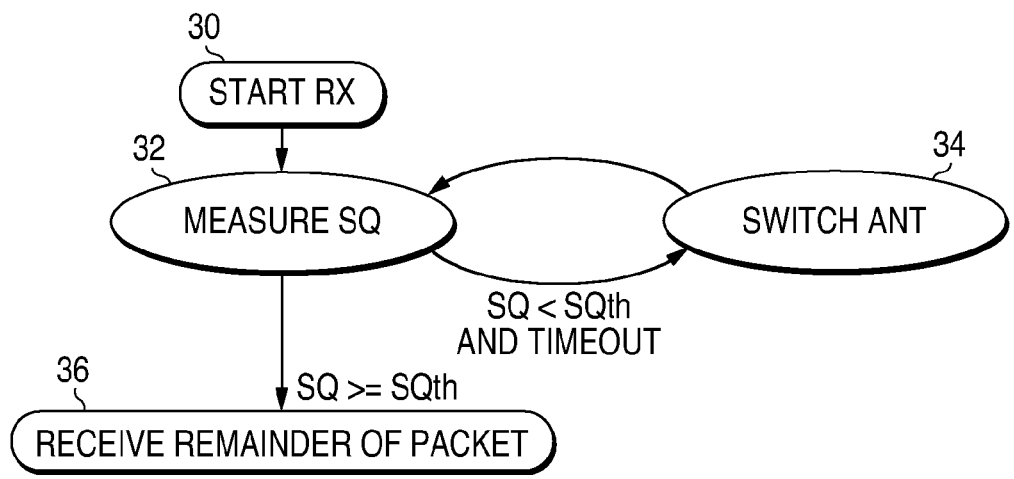
FIG. 2 is a state diagram illustrating an exemplary embodiment of one aspect of the present invention, wherein a receiver switches antennae seeking an antenna with signal quality above a threshold.

FIG. 2 is a state diagram illustrating an exemplary embodiment of one aspect of the present invention, wherein a receiver switches antennae seeking an antenna with signal quality above a threshold. To reduce the probability that the packet is missed because of a bad pre-selected antenna, the asynchronous receiver system 100, according to an exemplary embodiment of a receiver according to the invention shown in FIG. 6, will periodically switch antennas 102a-c whenever the received signal is below the Signal Quality threshold (SQth) for a fixed interval of time. When an antenna 102a-c is selected that results in a signal quality SQ 110 that equals or exceeds SQth, the selected antenna 102a-c is utilized to receive the remainder of the packet.

In the example of FIGS. 2 and 6, controller 114 of FIG. 6 is programmed to implement the state machine depicted in the state diagram of FIG. 2. Operation begins in the Start RX state 30 and proceeds to the Measure SQ state 32. In the "Measure SQ" state 32, the Signal Quality (SQ) is measured and output on SQ signal 110. Every time the "Measure SQ" state 32 is entered, a timer 116 is started in controller 114. The timer allows the receiver to settle and to measure the SQ signal 110. At the end of the timed duration, if the controller 114 determines that the receiver circuit 106 has not detected a signal with sufficient quality to cause signal quality SQ 110 output to exceed or equal to the SQ threshold (SQth), then the Switch Antenna state 34 is entered, the next antenna 102 is selected by controller 114 utilizing switch 104, and operation proceeds to the Measure SQ state 32. Alternatively, controller 114 may switch to the next antenna before the timer elapses as soon as it detects that signal quality SQ 110 does not meet SQth. If the signal quality SQ 110 exceeds or equals SQth during the timed interval of the Measure SQ state 32, then operation proceeds to state "Receive Remainder of Packet" 36 and the current antenna 102a-c selection becomes the final choice to receive the remainder of the received packet. The timer 116 is retired.

The preferred maximum measurement time required (i.e. the timer 116 value used to measure the time to remain in the Measure SQ state 32 when there is insufficient signal quality) is Tp1/N, were Tp1 is the duration time of the part of the signal that can be used to select the antenna 102 (e.g. the preamble length of a packet) and N is the number of antennas 102a-c employed by the asynchronous receiver system 100. This is to guarantee that the antenna 102a-c selection will be switching frequently enough to "catch" the packet on one of the used antennas 102a-c. In other words, controller 114 continuously cycles through the antennas 102a-c until it finds a packet with a signal quality the meets the threshold requirement. The rate of cycling is selected so that the controller 114 will cycle through all of the available antennas 102a-c within the preamble period of a packet so that no packets are missed. The controller 114 resumes cycling through antennas 102a-c to catch the next packet so that the receiver does not try to receive the next packet on a selected antenna whose signal has been degraded by path fading, for example. In some embodiments, in order to cycle faster through all the antennae, controller 114 may be configured to move to the next antenna 102a-c as soon as it detects the SQ 110 meets, e.g. equals or exceeds, SQth and before the timer expires. In other embodiments, in order to ensure good reception quality, controller 114 may be configured to prolong the timer and remain on the selected antenna for longer than the initial timer value if the signal quality meets a second threshold value that is lower than the first threshold value SQth to monitor whether the signal quality will improve enough to meet the first threshold value.

Figure 7:
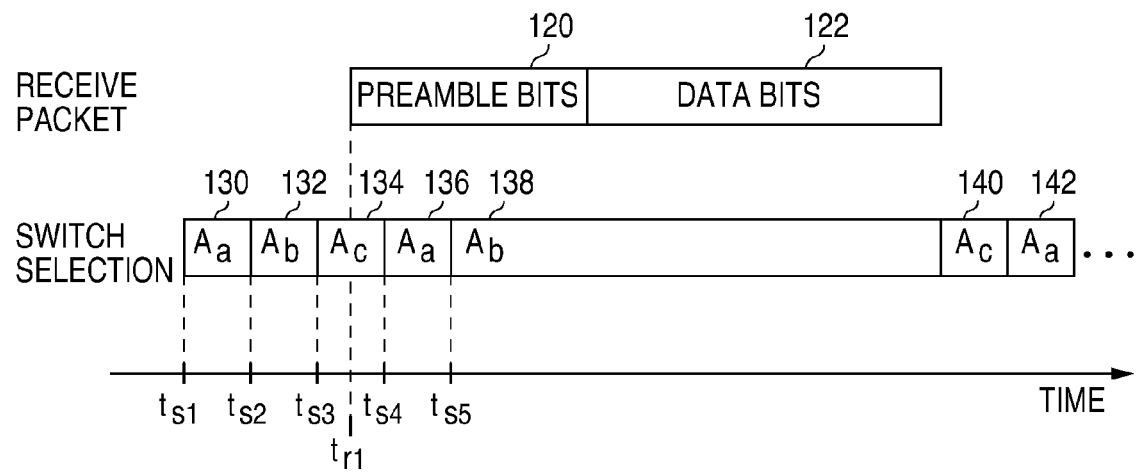
FIG. 7 is a timing diagram illustrating an example of packet reception in accordance with certain aspects of the present invention.

FIG. 7 is timing diagram illustrating an example of the timing relationships while receiving a packet in accordance with the embodiment of FIGS. 2 and 6. The asynchronous receiver system 100 first enters state Measure SQ 32 at $t_{s1}$. It remains in that state with antenna 102a selected for time duration $A_a$ 130. At time $t_{s2}$, the antenna 102a is switched to antenna 102b, which remains selected for time duration $A_b$ 132. This periodic antenna selection process continues. At time $t_{r1}$, the packet preamble 120 reception begins. The arrival of the preamble 120 is not synchronized to the switch selection or to the asynchronous receiver system 100 in any way. During time interval $A_b$ 138, the selected antenna is 102b and the signal quality 110 exceeds the signal quality threshold in this example. This causes the controller 114 to stay with the selected antenna 102b for the remainder of the packet including the packet data 122.

Figure 3:
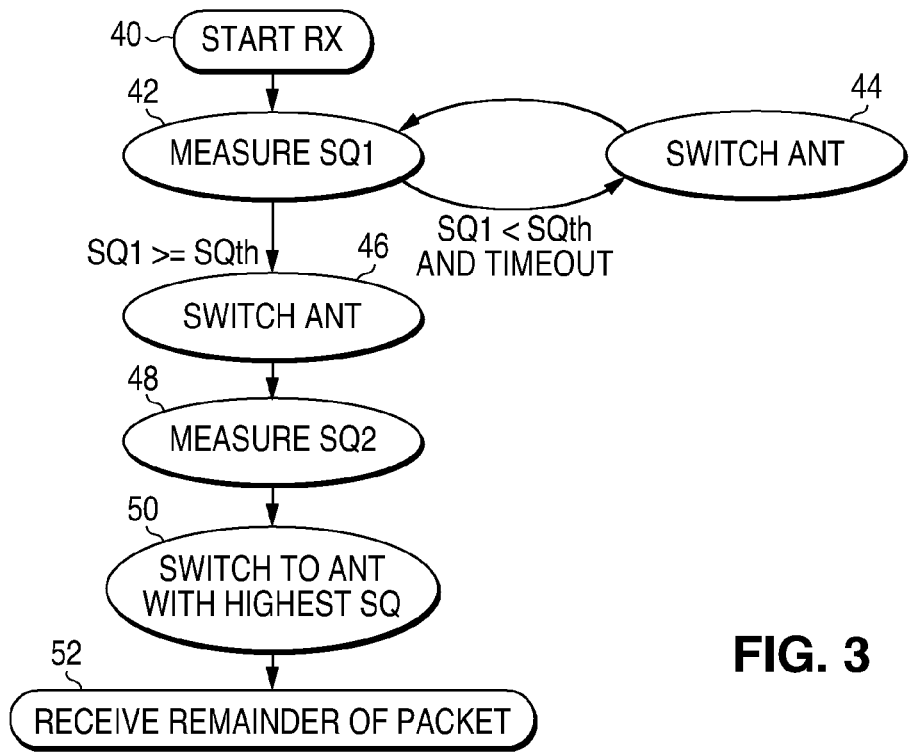
FIG. 3 is a state diagram illustrating an exemplary embodiment of another aspect of the present invention, wherein a receiver measures signal quality on multiple antennae and selects the antenna with the highest signal quality.

FIG. 3 is a state diagram illustrating an exemplary embodiment of another aspect of the present invention, wherein a receiver measures signal quality on multiple antennae and selects the antenna with the highest signal quality. The embodiment of FIG. 3 is based on the insight that once an antenna is selected with a valid signal indication (according to the first embodiment of FIG. 2), then the received quality might be sub-optimal because one or more previous measurements on the other antenna(s) might have been taken in the noise before the packet arrival. Antenna selection is further improved in the second embodiment: When the signal quality indicates a valid signal for the first time the diversity algorithm will check the other antennas for a higher Signal Quality indication and finally selects the antenna that had resulted in the highest signal quality measurement.

In the example of FIG. 3, operation begins in the Start RX state 40 when the asynchronous receiver system 100 of FIG. 6 is powered up, for example, and proceeds to Measure SQI state 42. In the "Measure SQ1" state 42, the Signal Quality (SQ) is measured and output as SQ signal 110. Each time the "Measure SQ" state 42 is entered, a timer 116 is started in controller 114. At the end of the timed duration, e.g. timer expiration, if the controller 114 determines that the receiver circuit 106 has not detected a signal with sufficient quality to cause signal quality SQ 110 output to exceed or equal to the SQ threshold (SQth), then the Switch Antenna state 44 is entered, the next antenna 102a-c is selected, and operation immediately proceeds to the Measure SQ state 42. If the signal quality SQ 110 exceeds or equals SQth during the timed interval of the Measure SQ1 state 42, then operation proceeds to state Switch Antenna 46 where another antenna 102a-c is selected and the signal quality SQ2 for the newly selected antenna is measured at state 48. Operation proceeds to state 50 "switch to antenna with highest SQ" where the antenna with the highest SQ value is selected, and then operation proceeds to state "receive the remainder of the packet" 52 where the remainder of the packet is received. The timer 116 is retired.

Although the example of FIG. 3 only illustrates choosing between two antennas, the invention applies when there are more than two antennas. For example, with three antennas 102a-c, as shown in FIG. 6, the Measure SQ1 state 42 could correspond to using antenna 102a, the Measure SQ2 state 48 could correspond to antenna 102b, and a Measure SQ3 state (not shown) could correspond to antenna 102c. In this way, higher numbers of antennas greater than one may be supported.

Figure 4:
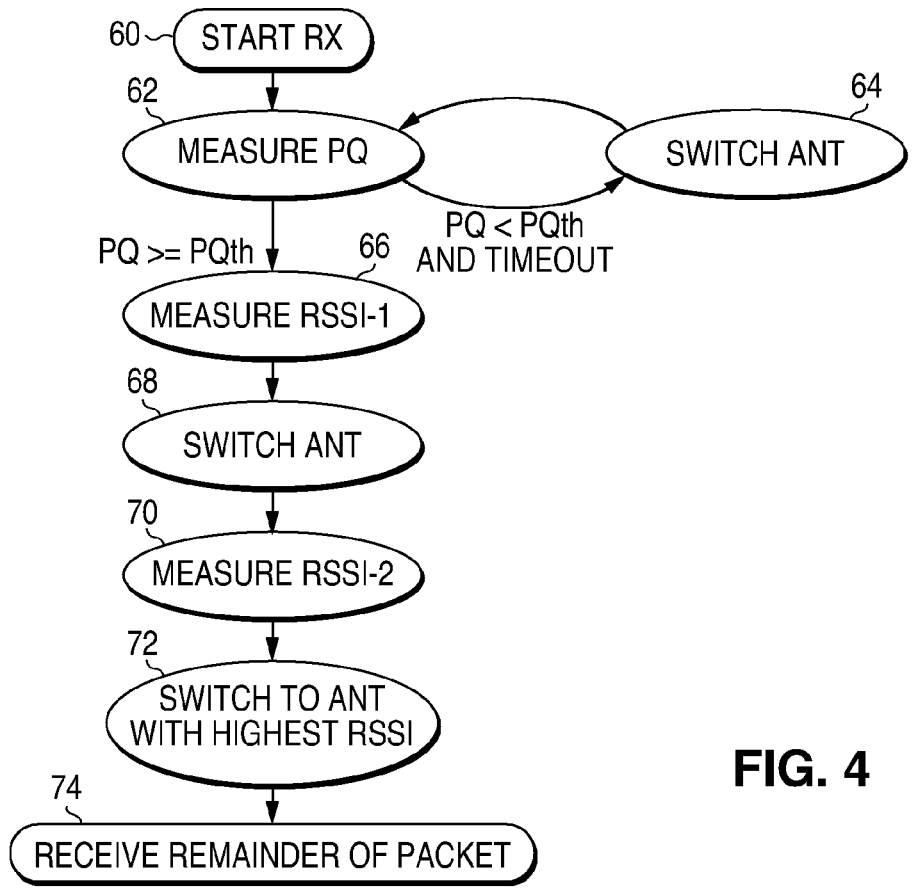
FIG. 4 is a state diagram illustrating an exemplary embodiment of another aspect of the present invention, wherein a receiver measures preamble quality and received signal strength indicator values.

Referring for FIG. 4, a third embodiment is shown that is aimed at reducing the length of a packet preamble required for successful reception. A preamble quality (PQ) detector in the receiver circuit 106 is used to determine the Preamble Quality (PQ) in state Measure PQ 62. When the preamble detector indicates an invalid preamble, e.g. with the Not Valid Signal 112, or the duration in state Measure PQ 62 times out, then the next one of antennas 102a-c is selected in state "Switch Antenna" 64 and operation continues to state "Measure PQ" 62 where the receiver will try again to receive a valid preamble. When the preamble detector indicates a valid preamble, e.g. asserts the optional PREAMBLE DETECTED signal 113 in FIG. 6, then the RSSI is output on the signal quality signal SQ 110 so the controller 114 can store it at state "Measure RSSI-1" 66. Note that the NOT VALID SIGNAL 112 and the PREAMBLE DETECTED SIGNAL 113 may both be inactive during some time periods, such as when the receiver circuit 106 is settling. Operation proceeds to state "Switch Antenna" 68, where the receiver switches antennas 102a-c and then state "Measure RSSI-2" 70 where the RSSI is measured and stored for the next antenna, and so forth for all antennas 102a-c. Operation proceeds to state "Switch to antenna with highest RSSI" 72 where the antenna is selected with the strongest RSSI value. The remainder of the packet is received in state 74. Since the RSSI measurements can be measured relatively fast, some time is saved and the preamble length may be shortened.

Figure 5:
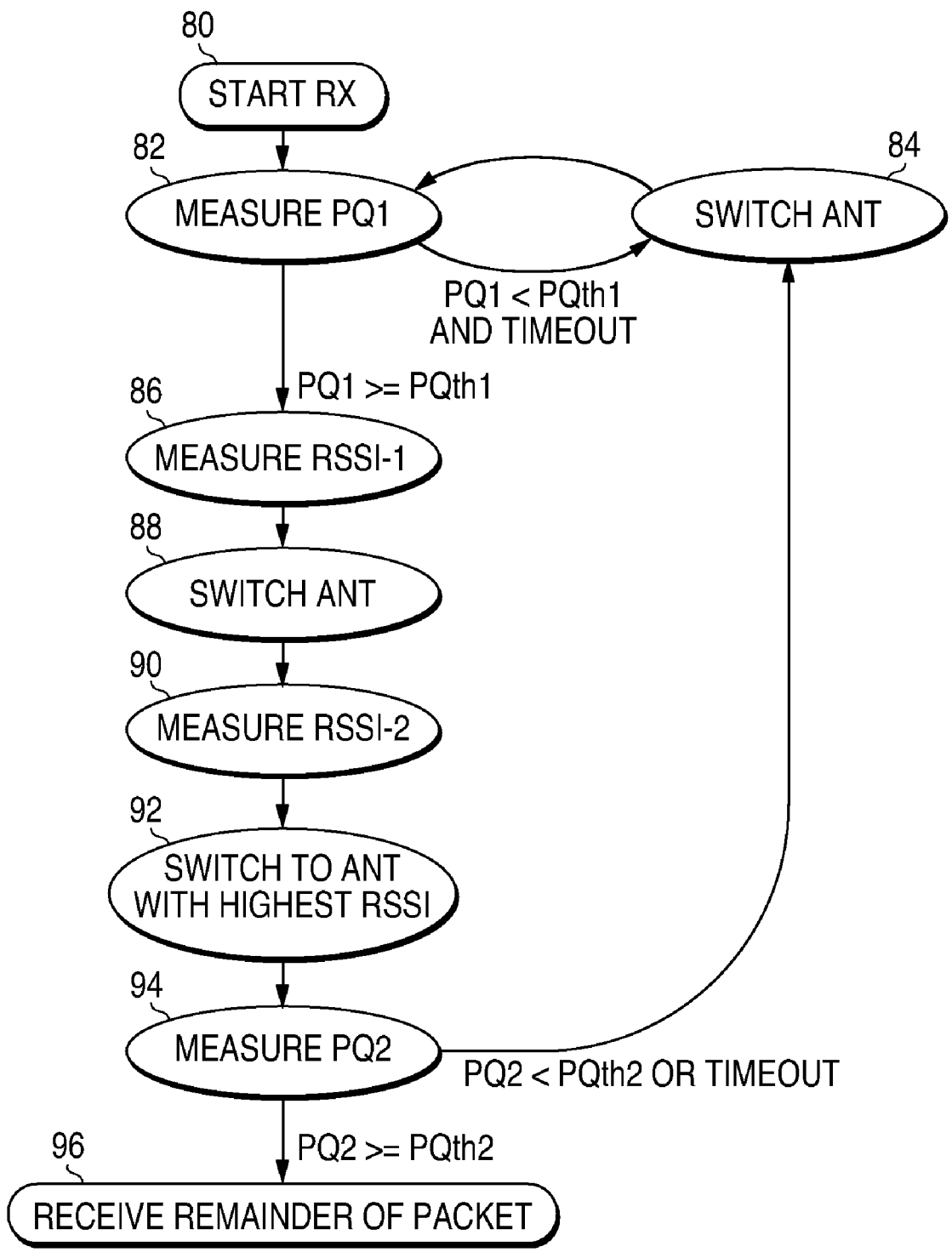
FIG. 5 is a state diagram illustrating an exemplary embodiment of another aspect of the present invention, wherein a receiver measures preamble quality and received signal strength indicator values, and remeasures preamble quality.

The state machine for a fourth embodiment, which is an extension of the approach taken in the embodiment of FIG. 4, is depicted in FIG. 5. This fourth embodiment reduces the probability of a false preamble detection by detecting the preamble again after the final antenna selection. This is a final confirmation that the antenna 102a-c selection is resulting in quality reception. If not, the diversity algorithm starts again by returning to the "Switch Ant" state 84. When the preamble is detected successfully in state "Measure PQ2" 94 then the final antenna selection will be used for the remainder of the packet at state 96.

In one embodiment of an antenna diversity receiver 100, the asynchronous receiver system 100 includes an asynchronous receiver circuit 106 that receives and demodulates the received signal as presented to the RF input. The asynchronous receiver circuit 106 incorporates a signal quality detection circuit 108 that assesses the quality of the received signal at the RF input and, in response, generates output signal SQ 110. This embodiment also includes a controller 114 and a switch 104 for selecting one of the receive antennas 102*a-c*. The controller 114 actuates the switch 104 to force periodic switching between antennas 102*a-c* when the detected Signal Quality SQ 110 is below the Signal Quality threshold (SQth) characterized by a switching time of at least faster than the preamble duration divided by the number of applied antennas 102*a-c*. The controller 114 is also configured to select one of the applied antennas 102*a-c* based on detected Signal Quality when the detected Signal Quality on at least one antenna is equal or higher than the Signal Quality threshold. The controller 114 also includes at least one output to control an RF switch 104 to selectively connect each of the applied antennas 102*a-c* to an input of RF asynchronous receiver circuit 106.

In a further refinement of this embodiment of an asynchronous receiver system 100, the controller 114 is further configured to select an antenna 102*a-c* based on the best detected Signal Quality when the detected Signal Quality 110 on at least one antenna 102*a-c* is equal or higher than the Signal Quality threshold (SQth) with the addition that when the Signal Quality 110 exceeds the Signal Quality threshold for the first time it will switch back to check the other antennas 102*a-c* one more time and finally select the one of antennas 102*a-c* with the highest Signal Quality 110. In another refinement of this embodiment, the controller 114 is further configured to observe the signal quality 110 during a preamble of a received signal or packet.

In another refinement of this embodiment of an asynchronous receiver system 100, the controller 114 is configured to finalize and hold the antenna 102*a-c* selection either before or at the end of the preamble. In another refinement, the controller 114 is configured, when the detected Signal Quality 110 is below the Signal Quality threshold, to select each antenna 102*a-c* for a time interval that is less than Tpreamble/N, where Tpreamble is the time duration of the preamble and N is the number of antennas 102*a-c* used in the Antenna Diversity arrangement 100. In another embodiment, the controller 114 includes a timer 116, wherein periodical switching is performed in response to the timer 116. In still another embodiment, the controller initiates periodical switching of the antennas responsive to a Not Valid Signal 112 output from the receiver circuit 106.

The Signal Quality detector 108 may include a signal correlation technique to be able to distinguish between interference and valid signal. This will improve the link under interference conditions. Examples of the signal quality detection circuit 108 includes a signal correlator or a combination of an RSSI and a signal correlator.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. An asynchronous receiver system comprising:
   a plurality of antennae;
   an asynchronous receiver circuit having a signal input, the asynchronous receiver circuit being configured to asynchronously receive a wireless signal at the signal input, the asynchronous receiver circuit being further configured to generate at least a first quality signal responsive to the received wireless signal;
   a switch configured to controllably select one of the plurality of antennae for coupling to the input of the asynchronous receiver circuit responsive to a control signal;
   a controller configured to receive the first quality signal and generate the switching control signal, where the controller is configured to sequentially select each one of the plurality of antennae, measure the first quality signal and start a timer with a time value for the selected antenna, select a next one of the plurality of antennae if the timer expires, store the measured values for the first quality signal, and select one of the plurality of antenna to receive a remainder of a data packet based on the measured first signal quality values for the plurality of antennae.

2. The system of claim 1, wherein the controller is further configured to receive the remainder of the data packet on the selected antenna if the measured first quality signal value meets the first threshold value.

3. The system of claim 1, wherein the time value of the timer is not greater than a packet preamble time length divided by the number of antennae of the plurality of antennae and where the controller is configured to force periodic switching between all of the plurality of antennae during the duration of the preamble.

4. The system of claim 1, wherein the controller is further configured to measure the first quality signal for each one of the plurality of antennae during the duration of a preamble of the data packet; and select the antenna with the highest first quality value to receive the remainder of the data packet.

5. The system of claim 1, wherein the timer is prolonged by the controller when the first signal quality signal exceeds a second threshold that is lower than the first threshold.

6. The system of claim 1, wherein the controller is configured to switch to a next one of the plurality of antennae before the timer expires when the first signal quality signal exceeds the first threshold.

7. The system of claim 1, where the controller is further configured to measure a second quality signal for each one of the plurality of antennae and select the antenna based on the measured values for the first and second quality signals to receive the remainder of the data packet.

8. The system of claim 1, where the controller is further configured to measure a second quality signal for each one of the plurality of antennae, select the antenna with the highest value for the second quality signal, measure the first quality signal for the selected antenna, receive the remainder of the data packet using the selected antenna when the first quality signal for the selected antenna meets the threshold value, and select another one of the plurality of antennae if the measured first quality value does not meet the threshold value.

9. The system of claim 1, where the controller is further configured to measure a second quality signal for the plurality of antennae, select one of the antennae for which the measured second quality signal meets a third threshold value, measure the first quality signal for the selected antenna, measure the first quality signal on the other antennae of the plurality of antennae, receive the remainder of the data packet using the antenna with the highest measured value for the first quality.

10. The system of claim 9, where the first quality signal is based on the Receive Signal Strength Indicator (RSSI) and the second quality signal is based on a preamble quality and indicates whether the preamble is valid or invalid.

11. A method for asynchronously receiving a data packet in an antenna diversity receiver having multiple antennas, the method comprising the steps of:
generating a first quality signal for a received signal;
sequentially selecting each of the antennas and, for each selected antenna, measuring a first quality signal and starting a timer with a time value for the selected antenna, selecting a next one of the antennas if the measured first quality signal value is below a first threshold value and the timer expires, and receiving a remainder of a data packet based on the measured first signal quality values for the plurality of antennae.

12. The method of claim 11, wherein the step of receiving a remainder of a data packet based on the measured first signal quality values for the plurality of antennae further comprises receiving the remainder of the data packet on the selected antenna if the measured first quality signal value meets the first threshold value.

13. The method of claim 11, wherein the time value of the timer is not greater than a packet preamble time length divided by the number of antennas of the diversity receiver; and where the method further comprises forcing periodic switching between all of the multiple antennas during the duration of the preamble.

14. The method of claim 11, wherein the step of sequentially selecting each of the antennas further comprises measuring the first quality signal for all of the antennas during the duration of a preamble of the data packet; and selecting the antenna with the highest first quality signal value to receive the remainder of the data packet.

15. The method of claim 14, wherein the step of sequentially selecting each of the antennas further includes prolonging the timer when the first signal quality signal exceeds a second threshold that is lower than the first threshold.

16. The method of claim 14, wherein the step of sequentially selecting each of the antennas further includes switching to a next one of the plurality of antennae before the timer expires when the first signal quality signal exceeds the first threshold.

17. The method of claim 11, where the step of sequentially selecting each of the antennas further includes measuring a second quality signal for each of the antennas and the step of receiving a remainder of the data packet further comprises selecting the antenna with the highest value for the second quality signal to receive the remainder of the data packet.

18. The method of claim 11, where the step of sequentially selecting each of the antennas further includes measuring a second quality signal for each of the antennas, measuring the first quality signal for the antenna with the highest value for the second quality signal; and
the step of receiving a remainder of the data packet further comprises selecting the antenna with the highest value for the second quality signal to receive the remainder of the data packet when the first quality signal for the selected antenna meets the threshold value, and select another one of the plurality of antennae if the measured first quality value does not meet the threshold value.

19. A system for asynchronously receiving a data packet in an antenna diversity receiver having multiple antennas, the system comprising:
means for generating a first quality signal for a received signal;
means for sequentially selecting each of the antennas and, for each selected antenna, measuring a first quality signal and starting a timer with a time value for the selected antenna, selecting a next one of the antennas if the measured first quality signal value is below a threshold value and the timer expires, and receiving a remainder of a data packet based on the measured first signal quality values for the plurality of antennae.

20. The system of claim 19, wherein the means for sequentially selecting each of the antennas further comprises means for measuring the first quality signal for all of the antennas and means for selecting the antenna with the highest first quality signal value to receive the remainder of the data packet.

21. The system of claim 10, further comprising a preamble detector configured to detect the presence of a valid data preamble; and where the second quality signal comprises a not valid signal provided by the preamble detector.

* * * * *